(12) United States Patent
Brenninger

(10) Patent No.: US 11,858,365 B2
(45) Date of Patent: Jan. 2, 2024

(54) ELECTRIC UTILITY VEHICLE DRIVELINE RECHARGING

(71) Applicant: AGCO International GmbH, Neuhausen (CH)

(72) Inventor: Martin Brenninger, Marktoberdorf (DE)

(73) Assignee: AGCO International GmbH, Neuhausen (CH)

( * ) Notice: Subject to any disclaimer, the term of this patent is extended or adjusted under 35 U.S.C. 154(b) by 467 days.

(21) Appl. No.: 17/284,593

(22) PCT Filed: Oct. 2, 2019

(86) PCT No.: PCT/EP2019/076696
§ 371 (c)(1),
(2) Date: Apr. 12, 2021

(87) PCT Pub. No.: WO2020/074342
PCT Pub. Date: Apr. 16, 2020

(65) Prior Publication Data
US 2021/0252987 A1 Aug. 19, 2021

(30) Foreign Application Priority Data

Oct. 11, 2018 (GB) ..................... 1816590

(51) Int. Cl.
*B60K 1/04* (2019.01)
*B60L 53/16* (2019.01)
(Continued)

(52) U.S. Cl.
CPC ............ *B60L 53/16* (2019.02); *B60K 1/00* (2013.01); *B60K 1/04* (2013.01); *B60K 17/22* (2013.01);
(Continued)

(58) Field of Classification Search
CPC .......... B60K 1/04; B60K 17/22; B60K 17/28; B60L 9/00; B60L 50/53; B60L 53/62; F15B 15/18
See application file for complete search history.

(56) References Cited

U.S. PATENT DOCUMENTS

| 5,947,855 A * | 9/1999 | Weiss ................. B60K 6/36 477/3 |
| 6,695,082 B2 * | 2/2004 | Bitsche ............... B60K 6/405 903/952 |

(Continued)

FOREIGN PATENT DOCUMENTS

| EP | 0 693 392 A1 | 1/1996 |
| EP | 0693392 A1 | 1/1996 |

(Continued)

OTHER PUBLICATIONS

Kockot et al., "Abschlussbericht zum Verbundvorhaben", Sesam—Published Jun. 28, 2016, https://www.tib.eu/en/search/id/TI8KAT:884617009/SESAM-Entwicklung-eine**vollelektrifizierten-Traktors?cHash=5747310274748d69740aa5556f51ed85.

(Continued)

*Primary Examiner* — Jason D Shanske
*Assistant Examiner* — James J Triggs

(57) ABSTRACT

An agricultural/utility vehicle has as its motive power source one or more electric motors supplied by one or more rechargeable batteries to drivingly rotate a shaft of the vehicle driveline. To recharge the batteries, an external power source is applied to cause the driveline shaft to rotate, resulting in at least one of the electric motors acting as a generator to recharge the batteries. The external power source may include a source of fluid pressure that drives a hydraulic pump of the driveline as a hydraulic motor. The external power source may be an external source of rota- (Continued)

tional energy coupled to a power take-off shaft of the vehicle.

20 Claims, 3 Drawing Sheets

(51) Int. Cl.
| | |
|---|---|
| *B60L 53/50* | (2019.01) |
| *B60L 53/62* | (2019.01) |
| *B60L 50/53* | (2019.01) |
| *B60K 1/00* | (2006.01) |
| *B60K 17/22* | (2006.01) |
| *B60K 17/28* | (2006.01) |
| *B60L 9/00* | (2019.01) |
| *F15B 15/18* | (2006.01) |

(52) U.S. Cl.
CPC ............... *B60K 17/28* (2013.01); *B60L 9/00* (2013.01); *B60L 50/53* (2019.02); *B60L 53/50* (2019.02); *B60L 53/62* (2019.02); *F15B 15/18* (2013.01)

(56) References Cited

U.S. PATENT DOCUMENTS

| | | | | |
|---|---|---|---|---|
| 7,128,671 | B2* | 10/2006 | Gu | B60K 6/485 |
| | | | | 477/6 |
| 7,828,091 | B2* | 11/2010 | Wedderburn, Jr. | F03D 9/32 |
| | | | | 180/2.2 |
| 8,469,127 | B2* | 6/2013 | Tarasinski | B60K 6/26 |
| | | | | 180/65.285 |
| 8,984,973 | B1* | 3/2015 | Brenninger | B60K 17/02 |
| | | | | 74/15.4 |
| 2007/0107957 | A1* | 5/2007 | Lehrer | B60W 20/00 |
| | | | | 180/65.245 |
| 2009/0018716 | A1 | 1/2009 | Ambrosio | |
| 2009/0025990 | A1* | 1/2009 | Futahashi | B66F 9/07572 |
| | | | | 180/65.245 |
| 2009/0095549 | A1* | 4/2009 | Dalum | B60L 1/00 |
| | | | | 180/65.265 |
| 2009/0223724 | A1* | 9/2009 | Heckeroth | B60K 1/04 |
| | | | | 180/2.2 |
| 2010/0117594 | A1* | 5/2010 | Bissontz | B60W 10/08 |
| | | | | 320/157 |
| 2011/0024255 | A1 | 2/2011 | Gomm et al. | |
| 2011/0031051 | A1* | 2/2011 | George | B60L 50/16 |
| | | | | 29/596 |
| 2012/0247846 | A1* | 10/2012 | Ichikawa | B60K 1/04 |
| | | | | 180/339 |
| 2012/0247860 | A1* | 10/2012 | Brenninger | B60W 10/103 |
| | | | | 180/282 |
| 2012/0262018 | A1* | 10/2012 | Thiara | H02K 53/00 |
| | | | | 74/DIG. 9 |

FOREIGN PATENT DOCUMENTS

| | | |
|---|---|---|
| GB | 2521626 A | 7/2015 |
| JP | H07223589 A | 8/1995 |
| WO | 2007031397 A1 | 3/2007 |

OTHER PUBLICATIONS

European Patent Office, Search Report related to Patent Application No. EP 19786733.6, dated May 16, 2023, 22 pages.

UK Intellectual Property Office, Search Report prepared for priority UK Application No. GB1816590.2, dated Apr. 10, 2019.

European Patent Office, International Search Report provided for parent International Patent Application No. PCT/EP2019/076696, dated Nov. 29, 2019.

* cited by examiner

ELECTRIC UTILITY VEHICLE DRIVELINE RECHARGING

CROSS-REFERENCE TO RELATED APPLICATIONS

This application is a national phase entry under 35 U.S.C. § 371 of International Patent Application PCT/EP2019/076696, filed Oct. 2, 2019, designating the United States of America and published in English as International Patent Publication WO 2020/074342 A1 on Apr. 16, 2020, which claims the benefit of the filing date of U. K. Patent Application 1816590.2, "Electric Vehicle Driveline Recharging," filed Oct. 11, 2018; the entire disclosure of each of which is incorporated herein by reference.

FIELD

The present invention relates to driveline/transmission systems for utility vehicles, particularly self-propelled agricultural machines such as farm tractors, and more particularly to such systems for electrically powered vehicles.

BACKGROUND

It is known that conventional agricultural vehicles such as tractors powered by internal combustion engines are not ecologically efficient due to the high volumes of fossil fuels consumed during operation. Furthermore, despite the legal imposition of increasingly stringent exhaust gas emission standards, generated pollution from such vehicles continues to be a concern. With the expectation that future legislation will only be more stringent, cleaner (more fuel-efficient and/or less polluting) solutions such as hybrid or fully electric vehicles are desired.

U.S. Pat. No. 8,469,127, "Drive System for an Agricultural or Industrial Utility Vehicle and Method for Operating a Drive System," granted Jun. 25, 2013, describes an example of a hybrid driveline for an agricultural or industrial utility vehicle, such as a tractor. The driveline includes a drive assembly that generates a mechanical torque by means of an internal combustion engine and first, second, and third electrical motors. The drive assembly has a first mechanical output shaft, driven by the second electric motor, which serves to drive at least one vehicle axle, and a second mechanical output shaft in the form of a power take-off (PTO) shaft. The internal combustion engine and first electric motor are each coupled to drive the second mechanical output shaft (PTO).

In one configuration of the driveline of U.S. Pat. No. 8,469,127, first and second electric motors are positioned adjacent one another (with driveshafts parallel and spaced apart) with the respective output driveshafts drivingly connected to one of the sun and planetary gears of an epicyclic gear arrangement, via one or more gear linkages for spatial reasons, with the outer epicylic ring gear driving the first output shaft and axle or axles of the vehicle, and the sun gear driving the second output shaft and the PTO. The third and, in some configurations, fourth electric motors are connected or connectable into the motive power portion of the driveline (to one or both of the front and rear axles) downstream of the drive to the PTO.

Though such a hybrid arrangement is more ecologically efficient in terms of reduced pollution through reduced fossil fuel usage and hence reduced emissions, the above-described arrangement is wasteful and costly in terms of the number of components (up to four electric motors in addition to an internal combustion engine) and causes problems from simply trying to physically accommodate them all in the relatively constrained space available under a tractor hood. It is an aim of tractor manufacturers to keep the profile of the hood as low as possible to improve the user's view of the area in front of the vehicle and to either side of the hood around the front wheels. Control issues also become a problem in an arrangement such as that of U.S. Pat. No. 8,469,127 with the need for coordination of the output speeds of the internal combustion engine and at least the first electric motor to ensure that the first electric motor is not being effectively driven in reverse (i.e. acting as a generator).

The per-vehicle fossil fuel usage and emissions issue is addressed at least partially by a fully electric vehicle, with pure electrical drives being more efficient (less energy wasting) than internal combustion engines. Some spatial concerns remain because the space currently filled by an internal combustion engine (and conventional gearbox or continuously variable transmission (CVT)) in a conventional vehicle may instead contain storage batteries (as it is understandably a goal that a working farm tractor should not have to return to base for recharging part-way through a working day) and power electronics for control of the electric motors. The latter may be simplified or avoided in a so-called intermediate hybrid in which a fully electric power source, operating at one or a limited range of speeds, is coupled with a conventional CVT. Though it is expected that ongoing developments in battery technology will continue to reduce the physical volume required to accommodate rechargeable battery storage sufficient to supply increasing capabilities of a working vehicle for a full day's work without recharging, unplanned conditions (e.g. heavier than expected soil due to weather conditions) may cause storage batteries to discharge faster than planned. In such circumstances, it is not desirable that the vehicle have to be towed back to the base for recharging.

BRIEF SUMMARY

In some embodiments, an agricultural/utility vehicle has as its motive power source one or more electric motors supplied by one or more rechargeable batteries, which electric motor or motors are connected to drivingly rotate a shaft of a driveline when coupled to provide motive power to one or more axles of the vehicle. The vehicle has one or more recharging inputs which, when coupled to an appropriate power source, cause the driveline shaft to rotate, causing one or more of the electric motors to act as a generator to recharge the one or more rechargeable batteries.

In one (hydraulic) arrangement, the driveline includes a hydraulic pump driven by rotation of the driveline shaft to supply pressurized fluid to one or more consumers on or attached to the vehicle. The recharging input comprises an external source of hydraulic pressure operable to cause the hydraulic pump to act as a hydraulic motor, rotatably driving the driveline shaft and thereby one or more of the electric motors. In such an arrangement, the vehicle suitably carries an external port providing the recharging input to receive hydraulic pressure to drive the hydraulic pump. A flow limiter may restrict the flow of pressurized hydraulic fluid by reference to one or more charging characteristics of one or more rechargeable battery, and a charge control mechanism may periodically adjust the flow of pressurized hydraulic fluid by the flow limiter in dependence on a current charge level of one or more rechargeable battery.

In an alternative (mechanical) arrangement, if the vehicle driveline includes a power take-off (PTO) drive shaft driven by one or more of the electric motors via the driveline shaft to provide rotational drive to an implement connected with the vehicle, the appropriate power source comprises connection of the PTO shaft to an externally-driven source of rotation, which drives at least one of the electric motors via the driveline shaft to act as a generator. In such an arrangement, the PTO shaft is suitably further provided with a connecting shaft to drivingly couple with a PTO shaft of another agricultural/utility vehicle, and at least one electric motor is preferably provided with a current limiter to control a maximum recharge current by reference to one or more charging characteristics of one or more electric motor when driven in a reverse (charging) mode.

The appropriate power source, whether electrical, mechanical, or hydraulic, is preferably provided by another vehicle. Where both vehicles have respective electronic control units (ECU), the ECUs are preferably connected during recharging (by ISOBUS or similar connection), with the ECU of the agricultural/utility vehicle being charged controlling delivery by the appropriate power source via the ECU of the further vehicle.

Another embodiment includes a method of recharging the storage battery or batteries of an agricultural/utility vehicle. The vehicle includes one or more electric motors driven by the storage battery or batteries and the electric motors rotationally drive a driveline shaft, providing rotational drive to one or more motive power axles of the vehicle or one or more consumers coupled with the vehicle to receive a rotational drive therefrom. The method includes coupling an external energy source to cause the driveline shaft to rotate, thereby causing one or more electric motors to operate as a generator.

If the vehicle comprises a hydraulic pump coupled to be driven by the driveline shaft, the coupling of an external energy source may include coupling an external source of fluid pressure such as to cause the hydraulic pump to operate as a hydraulic motor, and thereby cause one or more of the electric motors to operate as a generator. If the vehicle includes a power take-off (PTO) shaft directly driven by one or more of the electric motors, the coupling of an external energy source suitably comprises coupling an external source of rotational energy to the PTO shaft such as to cause one or more of the electric motors to operate as a generator, and thereby deliver a charge to at least one of the batteries.

BRIEF DESCRIPTION OF THE DRAWINGS

Further advantages will become apparent from reading the following description of specific embodiments with reference to the appended drawings in which.

DETAILED DESCRIPTION

Figure 1:
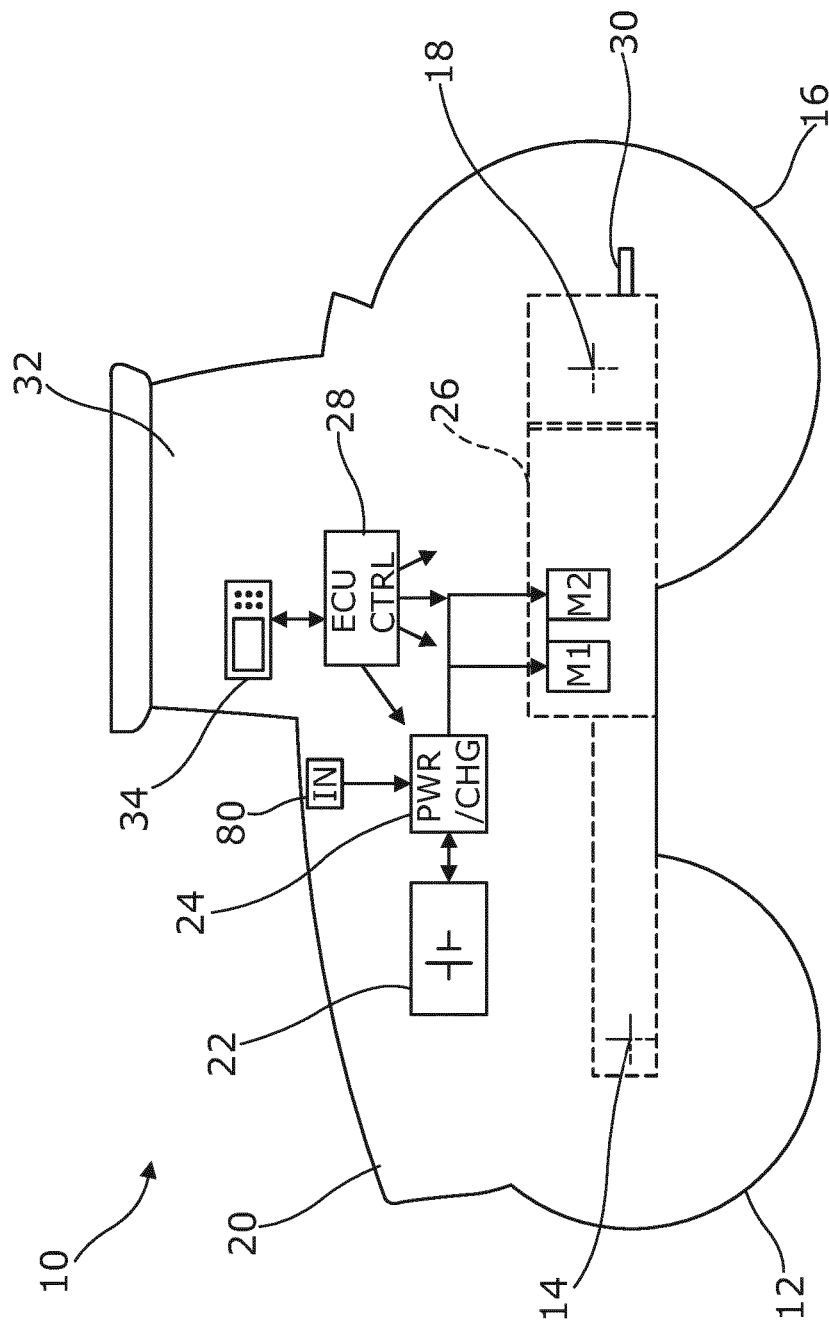
FIG. 1 is a representation of an agricultural/utility vehicle, in the form of a tractor, provided with a driveline according to one embodiment.

FIG. 1 schematically illustrates an agricultural vehicle 10 in the form of a tractor, having front wheels 12 driven by a front axle 14, rear wheels 16 driven by a rear axle 18, and a front hood 20 covering inter alia a storage battery 22 coupled via a power electronics (switching/charging) stage 24 to first and second electric motors M1, M2. The electric motors M1, M2 form part of a driveline (indicated generally by dashed line 26) providing motive power to the front and rear axles 14, 18 under control of an electronic control unit (ECU) 28. The driveline 26 also includes a power take-off shaft 30 which outputs a driven rotary drive to implements such as balers, tedders, etc., coupled to the rear of the tractor 10. The tractor 10 includes a user station in the form of a cab 32 that may include a user interface/control unit 34 by which a user may set or adjust operational parameters via the ECU 28.

Figure 2:
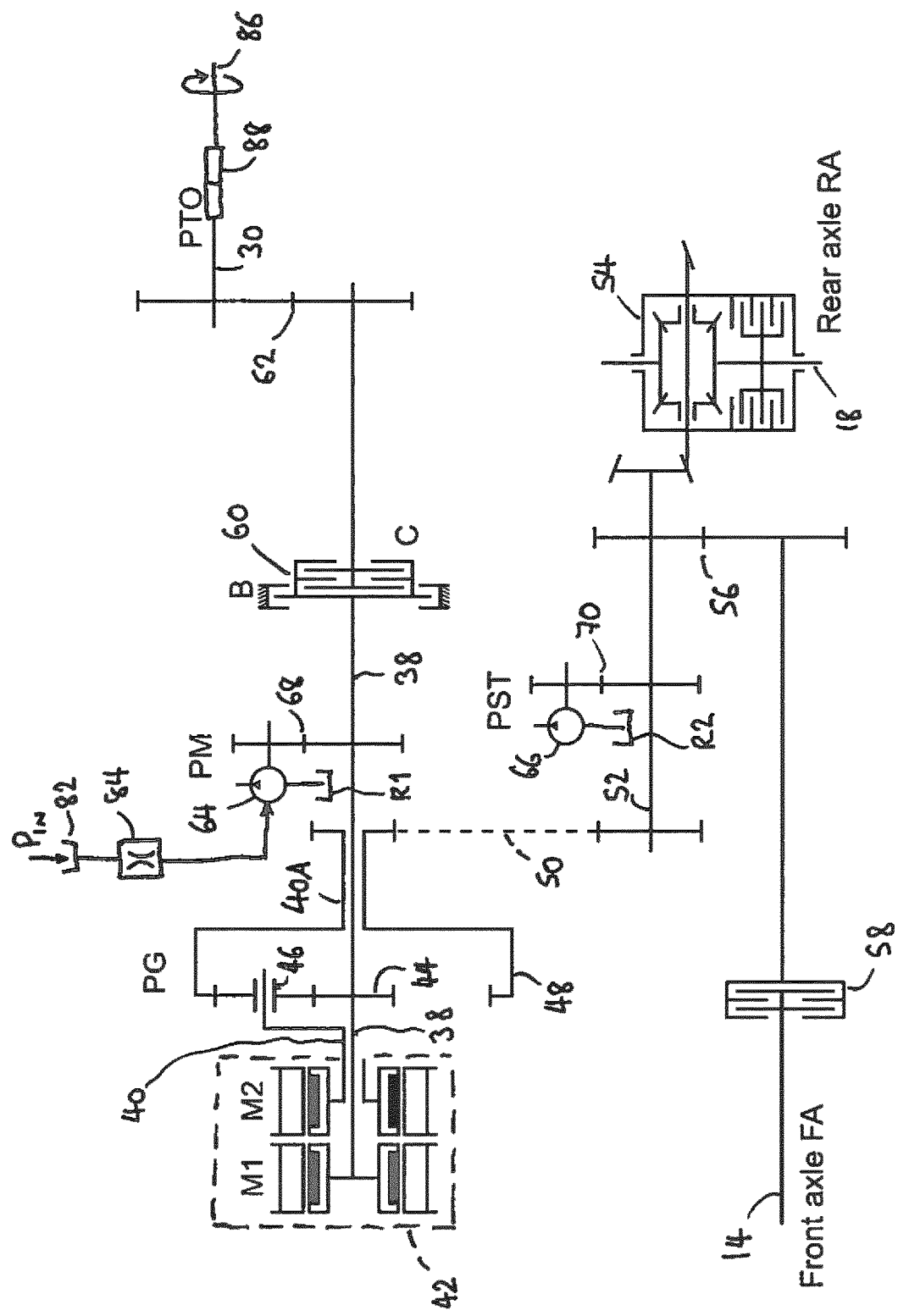
FIG. 2 is a schematic view of an embodiment of the driveline of the vehicle of FIG. 1.

FIG. 2 shows an exemplary first configuration of the driveline. The first M1 and second M2 electric drive motors are close coupled (connected to each other), with their respective output shafts 38, 40 being coaxial. This makes the motive power unit (the combination of M1 and M2) a compact unit that may be contained within a low profile single housing, illustrated by dashed line 42.

Mounted adjacent the motive power unit M1, M2 is an epicyclic (planetary) gear arrangement PG (which may optionally be enclosed within the single housing 42) with the first input shaft 38 directly (drivingly) coupled to the sun gear 44 thereof, and the second input shaft 40 directly coupled to one or more of the planetary gears 46 of the epicyclic PG. The outer ring gear 48 of the epicyclic PG is directly coupled to a first output shaft 40A and from there, via one or more connecting gears 50, drives an input shaft 52 of the drive to the front and rear axles 14, 18. The output shaft 52 is connected via a differential and braking unit 54 to the rear axle 18, and via a gearing linkage 56 and clutch unit 58 to the front axle 14.

The second output shaft 38 (an extension of the first input shaft and suitably a unitary body therewith) is connected via a brake-and-clutch unit 60 to a reduction gearing 62 which in turn drives the PTO output shaft 30. The clutch portion C of the brake-and-clutch unit 60 is operable to connect and disconnect the PTO shaft 30 from the second output shaft 38. The brake portion B of the brake-and-clutch unit 60 is on the motor side (relative to the clutch portion C) and, when actuated, prevents rotation of the second output shaft 38 and first electric motor M1.

The first electric motor M1 drives a main hydraulic pump PM 64 via the second output shaft 38 and a gearing linkage 68. The main pump 64 supplies pressurized fluid from a first fluid reservoir R1 to consumers on or attached to the vehicle, e.g., lifting cylinders forming part of a front or rear linkage, a front loader, and/or a front suspension of the vehicle 10.

The second electric motor M2 drives a steering hydraulic pump PST 66 via the input shaft 52 and a gearing linkage 70. The steering hydraulic pump PST 66 supplies pressurized fluid from a second fluid reservoir R2 (which may be separate from or common with R1) to a hydraulic steering system of the vehicle (e.g., tractor).

The main pump PM 64 (supplying fluid to, e.g., the lifting cylinders or the front suspension) is installed in the driveline connected to motor M1 but prior to the brake-and-clutch assembly 60 connecting the PTO 30 in this first embodiment. This has some major advantages:

1. A single pump (i.e., PST 66) can ensure steering and that main pump PM 64 is constantly driven;
2. Installing the main pump 64 in the driveline connected with the first electric motor M1 enables this main pump 64 to be switched off, e.g., when driving on the road where there is minor hydraulic consumption compared to field work. In the case that increased steering power is requested (e.g., when turning), the motor M1 may be activated while the PTO 30 branch is disconnected by the clutch part C of the brake-and-clutch assembly 60.

3. When the vehicle 10 is operated with an implement, both the main pump PM 64 and the PTO 30 may be operated.

In order to recharge the storage battery or batteries 22, a first option is to connect a suitable electric power supply, via an external connector 80 (FIG. 1) on the vehicle 10 and the power electronics stage 24, to the battery or batteries 22. This conventional option is typically performed at some base location for the vehicle and is suitably carried out overnight.

In order to recharge the storage battery or batteries 22 in a field location, where a suitable source of electrical power may be unavailable, two options are provided. In both options, the second output shaft 38 is driven by an external source to cause one or each of the electric motors M1, M2 to act as a generator and supply a charging current to the storage battery or batteries 22.

In the first option, an external source of hydraulic pressure PIN is coupled, via an external connector 82 (FIG. 2) on the vehicle, to drive the main hydraulic pump 64 as a hydraulic motor. Through gearing linkage 68, this drives the second output shaft 38. Note that in this situation, both the brake B and clutch C of the brake-and-clutch assembly 60 should be disengaged to prevent driving of the PTO 30. If the second electric motor M2 is to be connected to the first electric motor M1 so that both are charging, a further clutch mechanism (not shown) should be provided to disengage the drive to the front and rear axles 14, 18.

The fluid input from the connector 82 to the pump 64 may suitably include a flow limiter 84 controlled by the ECU 28 (FIG. 1) to control the fluid flow and thereby the pump speed and generating motor speed by reference to a charging characteristic and/or charge level of the battery or batteries 22.

Figure 3:
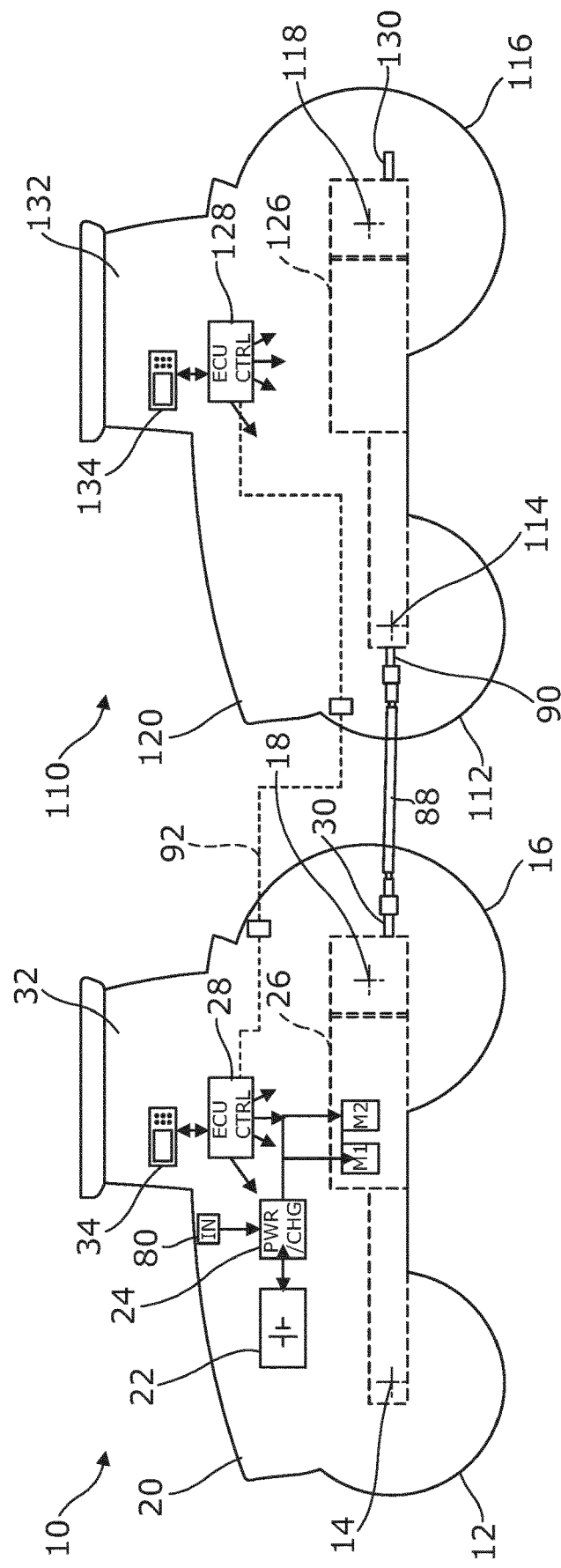
FIG. 3 shows the vehicle of FIG. 1 being charged by another vehicle.

FIG. 3 schematically illustrates a second option, with vehicle 10 being charged by another agricultural vehicle 110 (also shown in the form of a tractor). The vehicle 110 has front wheels 112 driven by a front axle 114, rear wheels 116 driven by a rear axle 118, and a front hood 120. A driveline (indicated generally by dashed line 126) provides motive power to the front and rear axles 114, 118 under control of an electronic control unit (ECU) 128. The driveline 126 also includes front and rear power take-off shafts 90, 130 which output a driven rotary drive to implements coupled to the vehicle 110. The vehicle 110 includes a user station in the form of a cab 132 which may include a user interface/control unit 134 by which a user may set or adjust operational parameters via the ECU 128.

In this second option, an external source of rotational energy 86 is coupled to drive the PTO 30 and gearing linkage 62 of the vehicle 10. In this situation, both the brake B of the brake-and-clutch assembly 60 should be disengaged and the clutch C engaged to couple the PTO 30 to the second output shaft 38. The PTO shaft 30 is suitably provided with a connecting shaft (such as a cardan shaft) 88 to drivingly couple with one of the PTO shafts 90, 130 of the vehicle 110 (providing the source of the rotational energy 86). As illustrated in FIG. 3, the connecting shaft 88 suitably connects the rear-mounted PTO 30 of the vehicle 10 to be charged with the front-mounted PTO 90 of the (charging) vehicle 110.

The power electronic stage 24 (FIG. 1) suitably acts as a current limiter to control a maximum recharge current by reference to one or more charging characteristics of the motor(s) M1, M2 and/or charge level of the battery or batteries 22 when driven in this "reverse" (charging) mode.

Where both vehicles 10, 110 in the arrangement of FIG. 3 have respective ECUs 28, 128, these ECUs are preferably connected during recharging (by ISOBUS link 92 or similar connection), with the ECU of the agricultural/utility vehicle 10 being charged controlling delivery by the appropriate power source, by controlling the PTO 90 of the further (charging) vehicle 110 via the ECU 128 of the further vehicle 110. Such an ISOBUS link 92 may also be used to control the delivery of hydraulic pressure from the further vehicle 110 to the first vehicle 10 where the power supply is in the form of the first option described above.

The agricultural/utility vehicle 10 has as its motive power source one or more electric motors M1, M2 supplied by one or more rechargeable batteries 22 to drivingly rotate a shaft 38 of the vehicle driveline. To recharge the batteries 22, an external power source PIN, 86 is applied to cause the driveline shaft 38 to rotate, resulting in one or more electric motors M1 acting as a generator to recharge the batteries 22. The external power source may include a source of fluid pressure PIN driving a hydraulic pump 64 of the driveline as a hydraulic motor, or an external source of rotational energy 86 coupled to a power take-off shaft 30 of the vehicle.

From reading of the present disclosure, other modifications will be apparent to those skilled in the art. Such modifications may involve other features which are already known in the field of vehicle driveline and power transmission systems and component parts therefore and which may be used instead of or in addition to features described herein.

The invention claimed is:

1. A utility vehicle, comprising:
   at least one axle;
   a driveline coupled to the at least one axle and configured to provide motive power to the at least one axle, the driveline comprising a driveline shaft;
   at least one rechargeable battery;
   at least one electric motor powered by the at least one rechargeable battery, the at least one electric motor connected to drivingly rotate the driveline shaft; and
   at least one recharging input, wherein when the at least one recharging input is coupled to an external power source, the at least one recharging input is configured to cause the driveline shaft to rotate,
   wherein rotation of the driveline shaft by the at least one recharging input causes the at least one electric motor to function as a generator and recharge the at least one rechargeable battery.

2. The utility vehicle of claim 1, wherein:
   the driveline further comprises a hydraulic pump configured to be driven by rotation of the driveline to supply pressurized hydraulic fluid to at least one consumer; and
   the at least one recharging input comprises an external source of hydraulic pressure operable to cause the hydraulic pump to act as a hydraulic motor to rotate the driveline shaft and the at least one electric motor.

3. The utility vehicle of claim 2, wherein the utility vehicle comprises an external port configured to provide hydraulic pressure to the at least one recharging input to drive the hydraulic pump.

4. The utility vehicle of claim 2, further comprising a flow limiter configured to restrict a flow of pressurized hydraulic fluid to the hydraulic pump.

5. The utility vehicle of claim 4, wherein the flow limiter is configured to restrict the flow of pressurized hydraulic fluid to the hydraulic pump based at least in part on a charging characteristic of the at least one rechargeable battery.

6. The utility vehicle of claim 5, further comprising a charge control mechanism configured to cause the flow limiter to periodically adjust the flow of pressurized hydraulic fluid based at least in part on a current charge level of the at least one rechargeable battery.

7. The utility vehicle of claim 1, wherein the driveline comprises a power take-off (PTO) drive shaft configured to be driven by the at least one electric motor via the driveline shaft to provide rotational drive to an implement connected with the utility vehicle.

8. The utility vehicle of claim 7, wherein rotation of the PTO shaft by the external source drives the at least one electric motor as a generator via the driveline shaft.

9. The utility vehicle of claim 8, wherein the PTO shaft further comprises a connecting shaft configured to drivingly couple with a PTO shaft of another utility vehicle.

10. The utility vehicle of claim 9, further comprising a current limiter configured to control a maximum recharge current flowing from the at least one electric motor to the at least one rechargeable battery.

11. A method of recharging at least one storage battery of a utility vehicle, wherein the utility vehicle comprises at least one electric motor configured to be driven by the at least one storage battery and wherein the at least one electric motor is configured to rotationally drive a driveline shaft to provide rotational drive to at least one axle of the utility vehicle, the method comprising:
coupling an external energy source to rotate the driveline shaft to cause the at least one electric motor to operate as a generator and charge the at least one storage battery.

12. The method of claim 11, wherein the utility vehicle comprises a hydraulic pump configured to be driven by the driveline shaft, and wherein coupling of an external energy source comprises coupling an external source of fluid pressure and causing the hydraulic pump to operate as a hydraulic motor.

13. The method of claim 11, wherein the utility vehicle comprises a power take-off (PTO) shaft directly driven by the at least one electric motor, and wherein coupling of an external energy source comprises coupling an external source of rotational energy to the PTO shaft.

14. The method of claim 11, wherein coupling of an external energy source comprises coupling a further vehicle to the utility vehicle.

15. The method of claim 14, further comprising connecting an electronic control unit of the utility vehicle to an electronic control unit of the further vehicle.

16. The method of claim 15, further comprising using the electronic control unit of the utility vehicle to control delivery of external energy from the further vehicle to the utility vehicle.

17. The method of claim 15, further comprising connecting the electronic control unit of the utility vehicle to the electronic control unit of the further vehicle by an ISOBUS link.

18. A system, comprising:
a first utility vehicle, comprising:
at least one axle;
a driveline shaft rotatably coupled to the at least one axle and a first power take-off (PTO) drive shaft;
at least one rechargeable battery; and
at least one electric motor powered by the at least one rechargeable battery, the at least one electric motor connected to drivingly rotate the driveline shaft; and
a second utility vehicle comprising a second power take-off (PTO) drive shaft coupled to the first PTO drive shaft;
wherein rotation of the second PTO drive shaft causes rotation of the first PTO drive shaft, the driveline shaft, and the at least one electric motor, causing the at least one electric motor to function as a generator and recharge the at least one rechargeable battery.

19. The system of claim 18, wherein the first utility vehicle and the second utility vehicle each comprise electronic control units connected to one another, wherein the electronic control unit of the first utility vehicle is configured to control rotation of the second PTO drive shaft.

20. The utility vehicle of claim 18, wherein the electronic control units are connected by an ISOBUS link.

* * * * *